United States Patent [19]

Garland et al.

[11] Patent Number: 5,248,139
[45] Date of Patent: Sep. 28, 1993

[54] DOCUMENT TRANSPORT APPARATUS

[75] Inventors: Harry T. Garland, Los Altos; Gerald A. May, Saratoga; Roger D. Melen, Los Altos Hills, all of Calif.

[73] Assignee: Canon Research Center America, Inc., Palo Alto, Calif.

[21] Appl. No.: 3,553

[22] Filed: Jan. 13, 1993

Related U.S. Application Data

[63] Continuation-in-part of Ser. No. 784,919, Oct. 30, 1991.

[51] Int. Cl.⁵ .................................... B65H 29/00
[52] U.S. Cl. ...................... 271/184; 271/902
[58] Field of Search ................. 271/184, 902

[56] References Cited

U.S. PATENT DOCUMENTS

| | | | |
|---|---|---|---|
| 3,999,852 | 12/1976 | Katayama et al. | 271/902 |
| 4,110,025 | 8/1978 | Tabata | 271/902 |
| 4,348,101 | 9/1982 | Schonfeld et al. | 271/902 |

*Primary Examiner*—Robert P. Olszewski
*Assistant Examiner*—Steven M. Reiss
*Attorney, Agent, or Firm*—Elizabeth F. Enavati; Edward J. Radlo

[57] ABSTRACT

A document transport apparatus (100) that may be attached to or integrated with a system (200) for performing a plurality of functions on a single sheet of paper. The apparatus (100) includes one or more elongate tray elements (102), having an end stop element (110) to stop the movement of the sheet of paper as it is delivered to the tray element (102). A rotation element (104), such as a roll bar, is attached to the tray element (102) and proximate to the receiving end (101) of the tray element (102). The rotation element (104) may selectively be activated by a motor (112) attached to the rotation element (104), to rotate the tray element (102) from a first position for receiving a sheet of paper from an output port (206) of one device, to a second position for delivering that same sheet of paper to the input port (208) of another device.

13 Claims, 5 Drawing Sheets

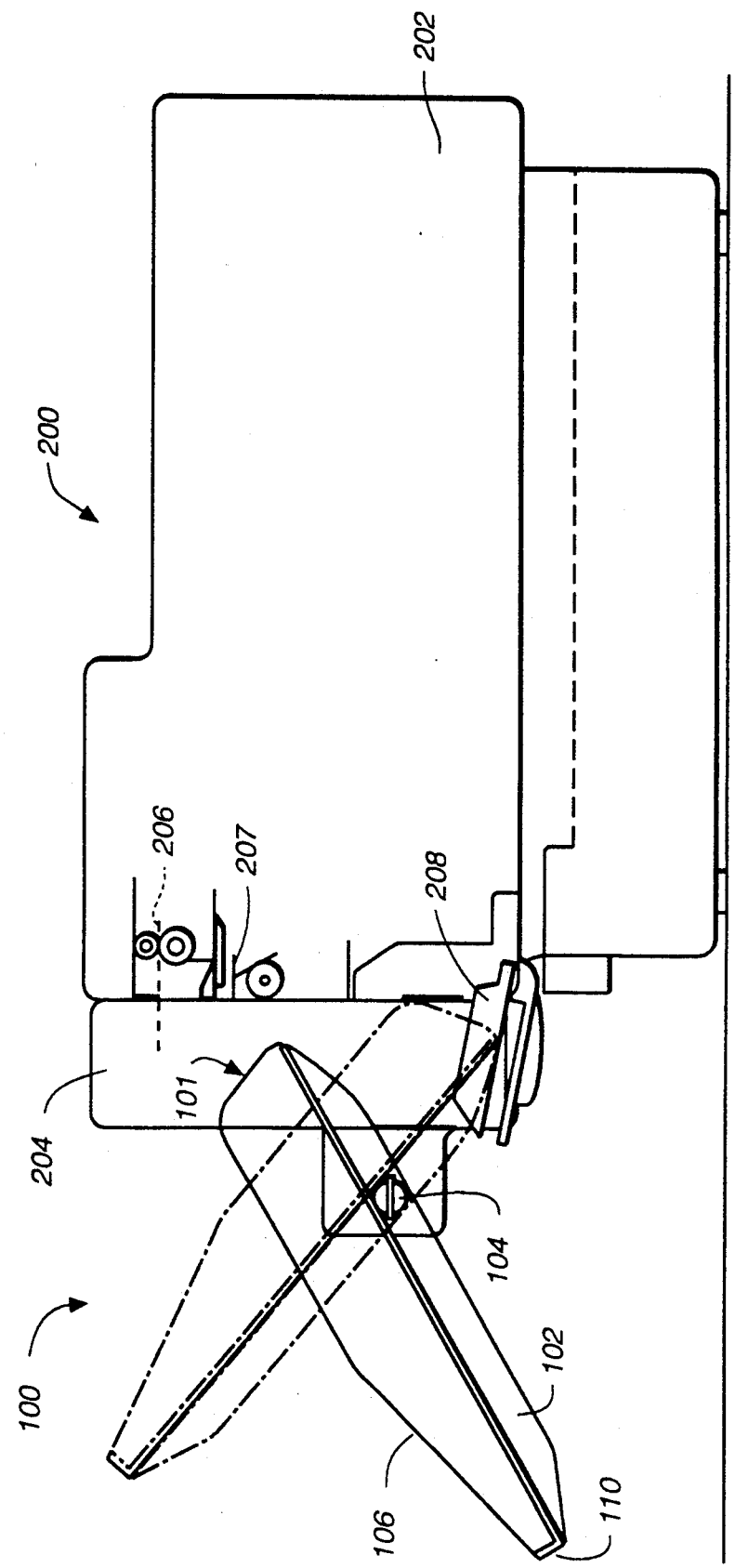
FIG._1

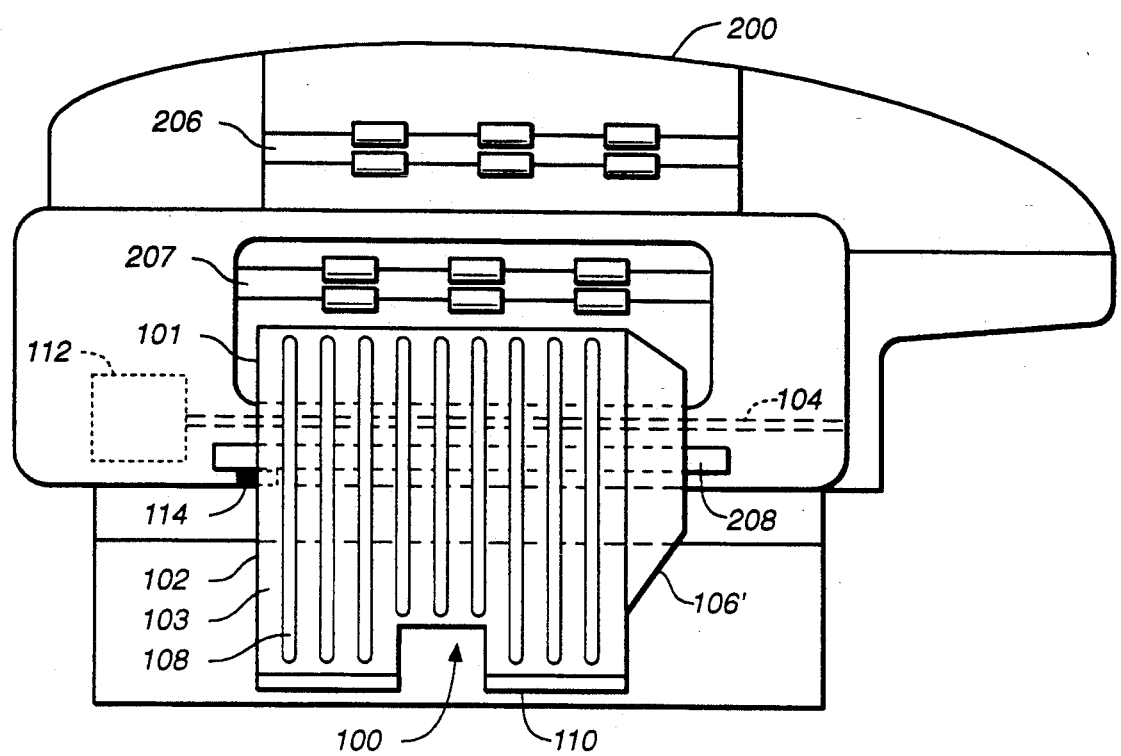
FIG._2
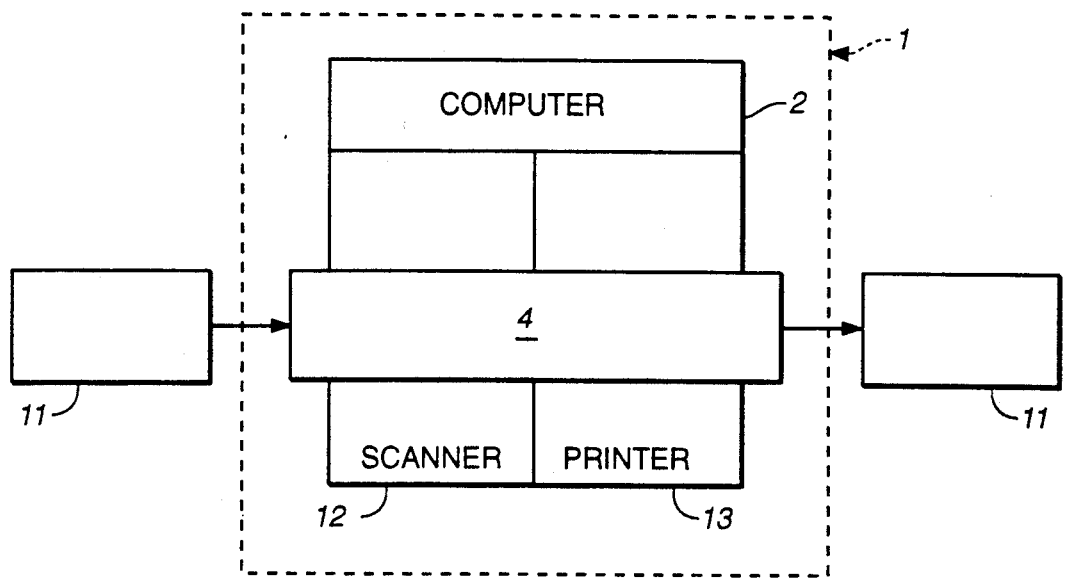
FIG._8

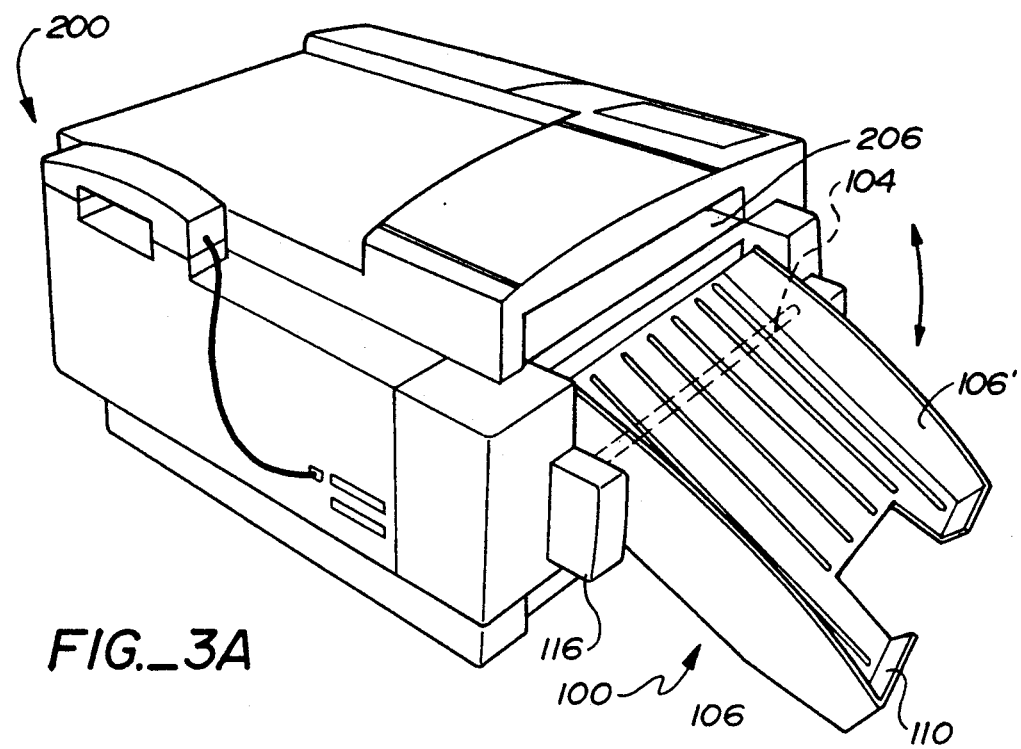
FIG._3A
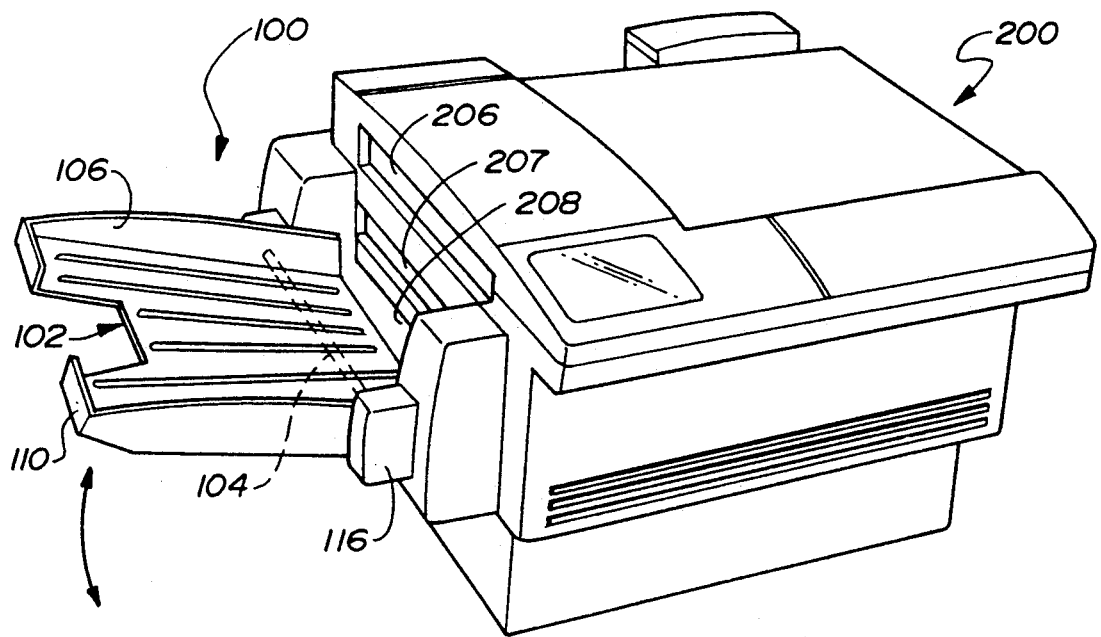
FIG._3B

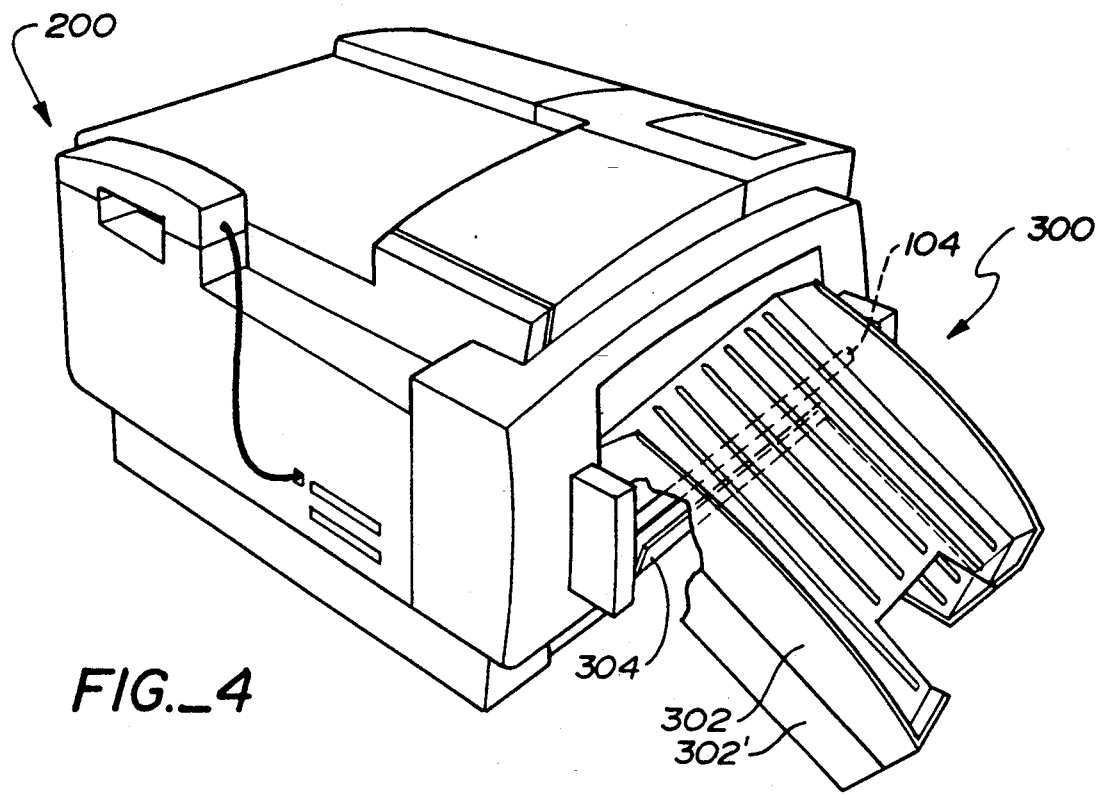
FIG._4
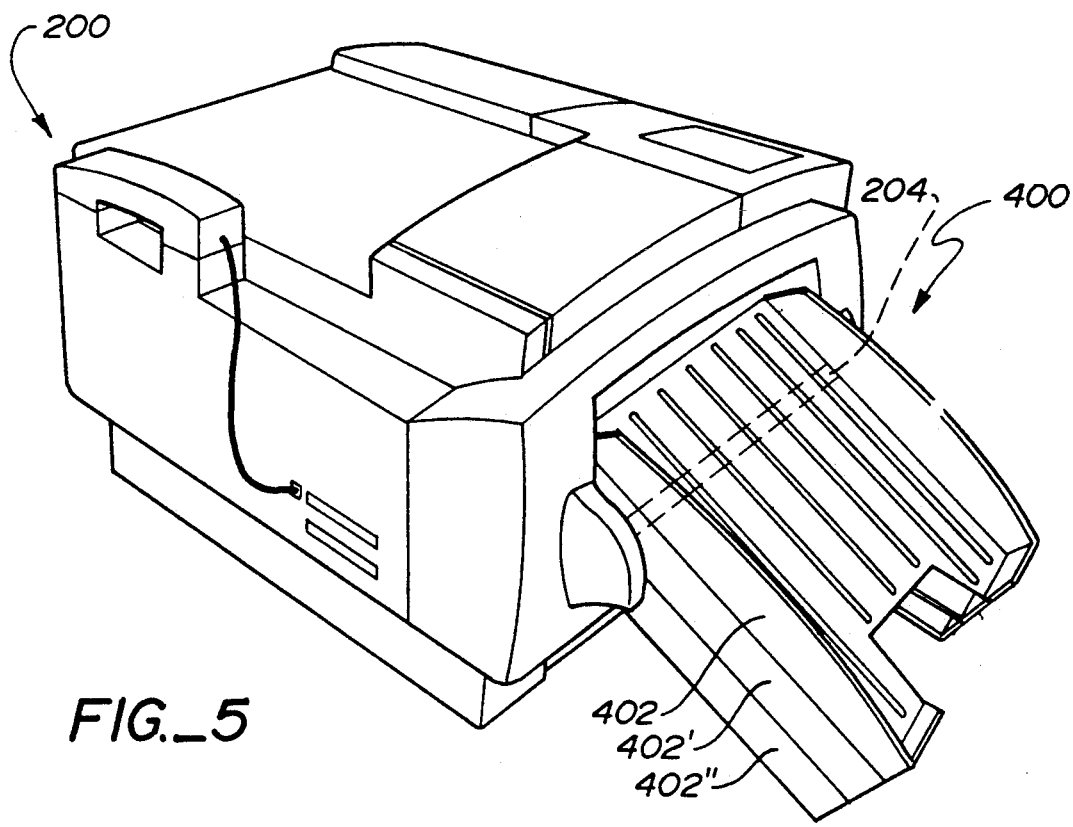
FIG._5

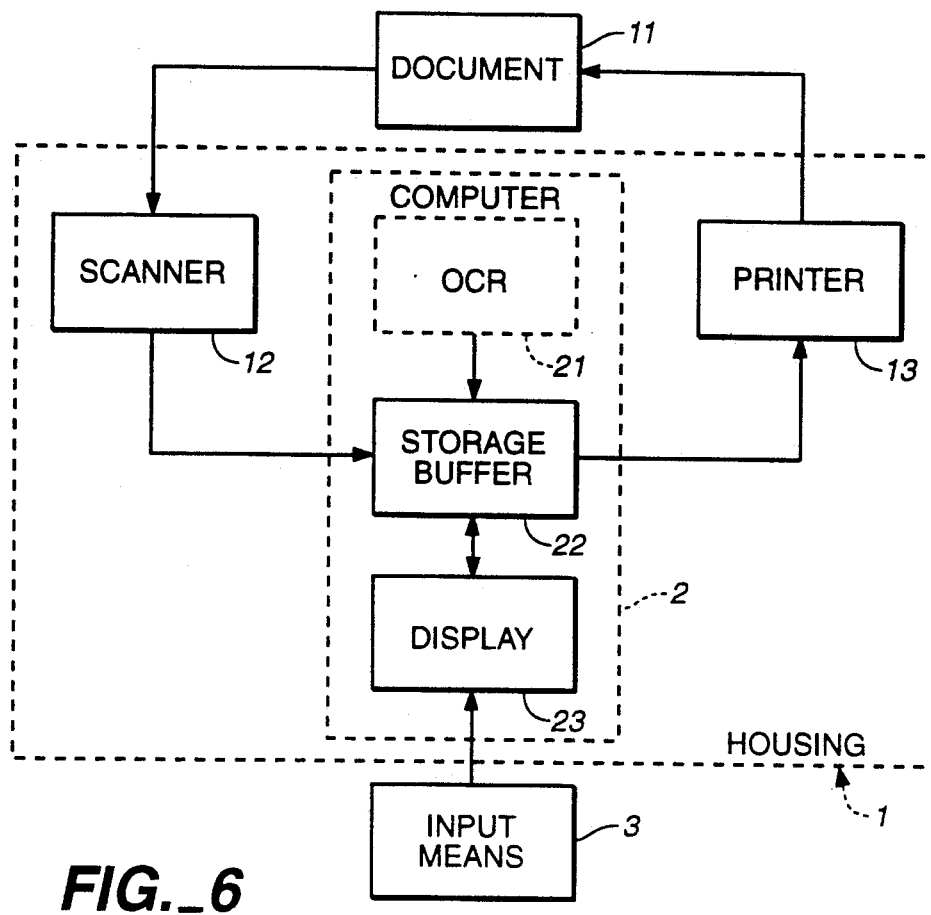
FIG._6
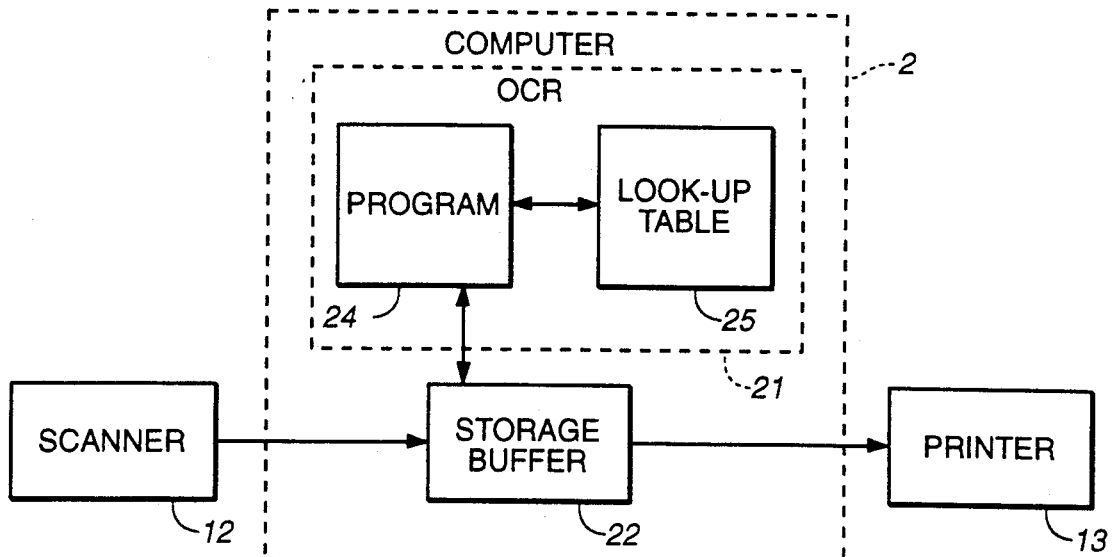
FIG._7

DOCUMENT TRANSPORT APPARATUS

CROSS-REFERENCE TO RELATED APPLICATIONS

This application is a continuation-in-part of application Ser. No. 07/784,919, filed Oct. 30, 1991, entitled "Unified Scanner Computer Printer".

FIELD OF THE INVENTION

The present invention generally relates to document transport apparatus, such as paper trays, designed for use in conjunction with a system for printing and/or scanning and/or sending/receiving facsimiles of documents or electronic mail. Specifically, the present invention relates to a paper tray that rotates between one position and another to permit receipt of a sheet of paper from and introduction of the same sheet of paper into the system.

BACKGROUND OF THE INVENTION

Document transport apparatus such as paper trays are found, in one configuration or another, as part of nearly every copy machine, facsimile machine, and scanner apparatus. Typical paper trays are either attachable to or integrated with the output side of the machine.

For systems that require more than one paper feeder or paper receiving tray, an elevator type system for moving the paper tray from one position to another may be included. For example, in collate mode on some copier systems, the paper receiver tray moves along a vertical axis to receive paper as it exits at different output ports of the machine.

Systems are now entering the market that have multiple function capabilities. For example, there is a system recently introduced to the marketplace under the name "DOC.IT", by Okidata, that is a combination printer, facsimile, scanner, and copier. The system is controlled by an external computer having software that integrates the various functions. However, that system has a fixed platform paper tray that stays at a fixed angle for either receiving fax paper or copied paper, or for introducing paper to be scanned or transmitted. The paper feeder tray does not permit multiple functions to be performed on a single sheet of paper.

Thus, there remains a need for a document transport apparatus that functions to both receive paper from a device and introduce that same sheet of paper to a different device.

SUMMARY OF THE INVENTION

The present invention is a document transport apparatus (100) that may be attached to or integrated with a system (200) for performing a plurality of functions on a single sheet of paper.

Basically, the apparatus (100) includes an elongate tray element (102), having an end stop element (110) to stop the movement of the sheet of paper as it is delivered to the tray element (102). A rotation element (104), such as a roll bar, is attached on the underside of the tray element (102) and proximate to the receiving end of the tray element (102). The rotation element (104) may selectively be activated by a motor (112) attached to the rotation element (104), to move the tray element (102) from one position to another.

In practicing the present invention, the receiving end of the tray element (102) is positioned adjacent a first output port (206) for one of the devices of the attached system (200). Port (206) may be a scanner output or a facsimile output. The tray (102) typically includes side walls (106) at least one of which is outwardly angled to guide the paper into the tray (102). The motor (112) then may be activated, and the tray (102) rotated to position the receiving end of the tray (102) against an input port (208) for another one of the devices of the attached system (200). The paper then may be introduced into the device, such as a printer for overprinting, or a copier for copying.

In alternative embodiments of the present apparatus, the apparatus (100) may include two or more tray elements (102) preferably in a stacked configuration, defining a tray assembly (300, 400). The entire tray assembly (300, 400) may then be rotated to receive paper from one or more devices, and to introduce the paper into one or more devices.

BRIEF DESCRIPTION OF FIGURES

FIG. 1 shows a side plan view of a system (200) incorporating the document transport apparatus (100) of the present invention;

FIG. 2 shows a front perspective view of an embodiment of the document transport apparatus (100) of the present invention;

FIG. 3A shows a side elevational view of a system (200) incorporating the embodiment of FIG. 2, showing the document transport apparatus (100) in a first position;

FIG. 3B shows a side elevational view of the system (200) of FIG. 3A showing the document transport apparatus (100) in a second position;

FIG. 4 shows a side elevational view of a system (200) incorporating a first alternative embodiment of the document transport apparatus (100) of the present invention; and FIG. 5 shows a side elevational view of a system (200) incorporating a second alternative embodiment of the document transport apparatus (100) of the present invention.

FIG. 6 is a schematic block diagram of an exemplary system (200) that may be used in conjunction with the present invention.

FIG. 7 is a schematic block diagram of an embodiment of an exemplary system (200) that may be used in conjunction with the present invention.

FIG. 8 is a simplified block diagram of an embodiment of an exemplary system (200) that may be used in conjunction with the present invention.

DETAILED DESCRIPTION OF THE PREFERRED EMBODIMENTS

The present invention generally is an apparatus 100 for receiving a sheet of paper from one device and delivering that same sheet of paper to a different device. The apparatus includes a paper tray element 102 that attaches to or is integral with a system 200 incorporating more than one type of paper-handling device. The apparatus 100 is mounted to the system 200 so that the tray element 102 rotates from a first position for receiving a sheet of paper from one device, to a second position for delivering that same sheet of paper to another device.

Turning to FIG. 1, that shows a side view of a system 200 incorporating the document transport apparatus 100 of the present invention. The illustrated apparatus 100 includes a tray element 102 pivotally mounted on a rotation element 104. The rotation element 104 is either integral with the system housing 202, attached to the system housing 202, or detachably fixed to the system housing 202. In a preferred embodiment, the apparatus 100 is detachably connected to the system housing 202 by a tongue-and-groove device.

In a typical system 200 of the type suitable for use with the present apparatus 100, the system 200 includes a recessed receptacle 204 for introducing a paper tray 102 of the type that holds several sheets of blank paper to be drawn into the system 200 for imprinting. In a preferred form of the present invention, the apparatus 100 has a width and design to fit into the recessed receptacle 204.

The tray element 102 preferably includes opposing walls 106 attached to opposite sides of the tray 102. The walls 106 may be of predetermined height sufficient to keep sheets of paper within the tray 102 during delivery of a sheet from the system 200, yet not so high that said walls 106 interfere with the movement of the tray 102 from one position to another within the recessed receptacle 204, as discussed in further detail below.

In a preferred form of the invention, one wall 106' is slightly outwardly angled (see FIG. 2). Most presently available systems 200 include any output port 206 from one device offset from an output (or input) port 208 of the other device. In that type of system, a tray 102 aligned with the first output port 206 would not be aligned with the second port 208. However, in a preferred embodiment of the invention, the tray 102 is aligned with the second port 208, and the angled wall 106' functions to guide the paper as it exits the first port 206 into the tray 102. Thus, if a sheet of paper is being delivered through the output port 206 of one top device into the tray 102, and the tray apparatus 100 is mounted in the center of the recessed receptacle 204, the outwardly angled wall 106' may act as a guide to direct the sheet of paper into the tray 102. For systems 200 in which the output/input ports 206, 208 of both devices are vertically in-line, the outwardly angled wall 106' may be omitted.

In a preferred form of the invention, and as shown in FIG. 2, the top surface 103 of the tray element 102 includes a plurality of raised rib elements 108 that extend along the longitudinal axis of the tray element 102. The ribs 108 function to raise the sheet of paper received in the apparatus 100 from the top surface 103 of the tray element 102 to substantially reduce accumulation of static electricity, which may inhibit movement of the sheet of paper into and out of the tray element 102.

The tray element 102 preferably includes an end stop element 110 at the end of the tray 102 opposite the receiving end 101 of the apparatus 100. The end stop element 110 may be extensions of the walls 106, or may be separate elements that upwardly extend from the end of the tray element 102. The stop elements 110 function to prevent a sheet of paper from sliding out of the tray element 102 as it is delivered from the system 200. The stop elements 110 may be a single unit, or may be several elements, and may be of any type generally known and available in the art. The end stop elements 110 may be designed to telescope for extending the length of the tray element 102 and thus to accommodate several paper types and sizes.

Preferably, the rotation element 104 is positioned on the bottom surface of the tray element 102 in a position proximate to the receiving end of the tray 102. The exact location of the rotation element 104 will depend on several structural variables, including how far the end 101 of the tray element 102 sits in the recessed receptacle 204 area. In a preferred embodiment, the end 101 of the tray 102 is positioned such that at least part of the tray 102 is within the recessed receptacle 204 area. In that embodiment, the position of the rotation element 104 will partially depend on the height of the receptacle 204. An important aspect of the invention is the ability of the apparatus 100 to move from a first position adjacent to the output port 206 of one device to a second position adjacent to the output/input port 208 of another device.

As an example, and not as a limitation, if the height of the recessed receptacle 204 measures about 4 inches (10.16 cm), a roll bar 104 would be positioned such that the portion of the tray 102 that extends from the roll bar 104 to the receiving end 101 is about 3.5 inches (8.90 cm). Preferably, the the end 101 does not contact the walls of the recess 204. Dimensions will depend on the specific configuration of the system 200 used in conjunction with the apparatus 100.

In a preferred embodiment, the rotation element 104 is a roll bar attached to the bottom side of the tray element 102. The rotation element 104 may also be attached directly to the side of the tray element 102. Other elements that permit the tray element 102 to rotate about an axis may also be used. The rotation element 104 is connected to an activation device 112, such as a motor. In a preferred embodiment, a ramping motor, such as a stepper motor, is used to move the tray apparatus 100. Many stepper motors are generally commercially available that would be satisfactory for use with the present apparatus 100. One commercially available stepper motor is Model K82439, available from Airpax Inc., Cheshire, Conn. The activation device 112 preferably is controlled by a microprocessor for gradually accelerating and decelerating the motor 112 for smooth movement of the tray apparatus 100 between positions without clatter.

In a prefered embodiment, the apparatus 100 further includes a detection element 114 for detecting the position of the sheet of paper and for providing feedback to the activation device 112. In alternative forms of the invention, the detection element 114 may include an optical detector 114, such as an optical limit switch, or a positional feedback device. The detection element 114 may provide positional feedback information to the activation device 112 either directly, or indirectly by sending the information to a computer that subsequently controls the activation device 112. The detector element 114 may be one of many such elements generally commercially available, such as Model OPB960, available from Optek Technology, Carrollton, Tex.

In practicing the present invention in a preferred embodiment, and as illustrated in FIGS. 3A and 3B, a registered over-printing system 200 may include the present apparatus 100. In the illustrated registered over-printing embodiment, a sheet of paper is scanned into a computer system, where the scanned document may be manipulated by a user. Typically, such a system is used for scanning in a form, and filling out that form on-line. The original sheet, or form, is then fed into a printer which imprints the information entered by computer onto the form.

The illustrated system 200 includes a scanner output port 206, a facsimile output port 207, and a printer input port 208. In operation, the tray apparatus 100 is placed in a first position, shown in FIG. 3A, whereby the receiving end of the tray apparatus 100 is adjacent the scanner output port 206 of the system 200. A document, or sheet of paper, is scanned through the scanner and the sheet is delivered into the tray element 102. The receiving end of the tray element 102 preferably is close to the output port 206 to prevent the sheet of paper from catching against the end of the tray 102. In one embodiment, the receiving end of the tray 102 is ramped to form a smooth entry for the sheet of paper.

Next, the activation device 112 rotates the rotation element 104, moving the tray element 102 from its first position, to a second position, shown in FIG. 3B. In the illustrated second position, the receiving end of the tray 102 is positioned adjacent the input port 208 of a printer device. The paper is then delivered into the printer input port 208, and exits at port 207. For example, a sheet of paper exiting port 206 from a scanner or from port 207 from a printer will fall into the tray 102.

In an alternative form of the invention, the apparatus 100 receives a sheet of paper from the facsimile output port 207 when in the first position. In alternative embodiments, port 206 may be either an output port or an input port, depending on the configuration of devices within the system 200. The tray 102 then is rotated to a second position from which the sheet of paper is delivered to a scanner input port 206, or printer input port 208. The apparatus 100 may be used with systems 200 having other combinations and configurations of devices.

An alternative embodiment of the present apparatus 100 is shown in FIG. 4 in its first position. In that illustrated embodiment, the apparatus 100 includes a two-level tray assembly 300. That assembly 300 includes an upper tray 302 and a lower tray 302', assembled in a stacked configuration. In a preferred form of practicing the illustrated assembly 300, the upper tray 302 functions in a manner similar to that of the single tray apparatus 100 described in detail above. The lower tray 302' may be designed as an escrow tray for holding received paper. In that embodiment, the lower tray 302' includes a retaining lip 304 adjacent the receiving end 101 of that tray 302' to prevent a sheet of paper delivered to the tray 302' from sliding out of the tray when the assembly 300 is rotated to the second position (not shown).

Another alternative embodiment of the present invention 100 is shown in FIG. 5 in its first position. In that illustrated embodiment, the apparatus 100 includes a three-level tray assembly 400. In that illustrated embodiment, the top tray element 402 is adapted to receive scanned documents. The middle tray 402' may be positioned from a first position to a second position in a manner for use with registered over-printing, substantially as described above in relation to the single tray embodiment of FIGS. 3A and 3B. The bottom tray element 402" may be used as an escrow tray for holding paper received from, e.g., facsimile device.

In the illustrated embodiments of both FIG. 4 and FIG. 5, any tray 102 of the assembly (300, 400) may be designated the escrow tray, or the tray that rotates between one output port 206 and another port 208. In yet another embodiment, more than one tray element 102 of either tray assembly 300, 400 may be adapted to both receive and deliver sheets of paper. The specific configuration of the assembly 300, 400 may depend on the type of system 200 in which it is incorporated.

FIG. 6 is a schematic block diagram of an exemplary system 200 that may be used in practicing the present invention. An optical scanner 12 converts written, printed, digital, and/or graphical information that appears on input document 11 into an electronic digital form, such as a bit map, and stores this information into a storage buffer 22 within a computer 2. The information within buffer 22 may then be edited by human means, automatic means, or some combination thereof. An example of human editing means is the combination of a display 23, such as a CRT or LCD, which normally includes associated storage registers, and an input device 3. Input device 3 may be a keyboard, mouse, electronic pen, etc., or a combination thereof.

Information from within buffer 22 may be portrayed on display 23, showing all the instruction text, blocks for addresses, boxes to be checked, arrows, letterheads, seals, and related graphics. The image on display 23 preferably is made to look exactly like the original document 11. The human operator edits this information by activating input device 3. The operator scrolls (and pans) the display 23 image, stopping at each blank region to be completed. In the case where input means 3 is a keyboard, the operator places the cursor in the blank region and enters ASCII text from keyboard 3. The entered ASCII text may immediately be displayed in the blank region, and may be changed or deleted using word processor editing features of computer 2. The operator can see the visible relationship between entered text and the original form on display 23. The operator can easily center the entered ASCII text up-right and left-down. Graphics information may be entered using a mouse 3 or electronic pen 3, and appropriate software.

When the operator is satisfied with the edits, the operator may issue a command to computer 2 to restore the edited information from display 23 back into storage buffer 22. Another command may then be issued to printer 13 to print the edited information from storage buffer 22. Alternatively, printer 13 can print directly from the storage registers of display 23. In either case, the printing can be done onto the original document 11; or an entirely new form including the edits can be printed, in which case the representation 22 of the original document 11 can be saved for later use as a master for later editing or mass production of forms 11.

As an example of an automatic editing means, FIG. 6 illustrates an optical character recognizer (OCR) 21 coupled to storage buffer 22. The operation of OCR 21 is illustrated in FIG. 7. A set of programmed instructions 24, which may be embodied in software, firmware, hardware, or some combination thereof, reads from storage buffer 22 the digital representation of the scanned document 11. Program 24 then compares this representation 22 with pre-stored cues that are stored within program 24 or within look-up table 25. When a match occurs, program 24 acts in a prearranged manner as defined by information contained within look-up table 25 to edit the representation 22 and restore the edited representation back into buffer 22, where it is subsequently printed onto document 11 by printer 13.

For example, the information scanned into buffer 22 may be a digital representation of the expression "name and address". When program 24 compares this representation from within buffer 22 with the identical representation from within itself or from table 25, it detects a match, automatically adds the name and address of the owner of computer 2 to the original representation after the expression "name and address", and resubmits the edited representation to buffer 22. Then when printer 13 prints this information onto the original document 11, the owner's name and address is automatically printed onto document 11 in the proper location.

In a preferred system 200 the scanner 12, computer 2, and printer 13 reside within the same physical housing 1. This greatly facilitates the use of the apparatus. FIG. 8 shows how this is accomplished using a single paper transport mechanism 4; which physically transports document 11 through scanner 12 and printer 13. Computer 2 is coupled to each of scanner 12 and printer 13; all three of these components are within the same physical housing 1.

The foregoing description of the preferred embodiment of the invention is presented only for purposes of illustration and description. It is not intended to be exhaustive or to limit the invention to the precise form disclosed, and many modifications and variations are possible in light of the above teaching. This embodiment is chosen and described in order to best explain the principles of the invention and its practical applications. It is also chosen to enable others skilled in the art to best utilize the invention in various embodiments and with various modifications as are suitable to the particular use contemplated. It is intended that the spirit and scope of the invention are to be defined by reference to the claims appended hereto.

What is claimed is:

1. Apparatus for selectively receiving a sheet of paper from a first device and feeding said sheet of paper into a second device, both said devices being contained in a single housing, said apparatus comprising:
   A. a tray assembly, including:
      an elongate first tray element, having a top surface and a bottom surface; and
      an end stop element connected to a first end of said first tray element for blocking movement of said paper off said first tray element;
   B. a rotation element attached to said housing and attached to said tray assembly and proximate a second end of said first tray element, for selectively rotating said tray assembly from a first position, wherein said second end of said first tray element is aligned to receive a sheet of paper from said first device, to a second position, wherein said second end of said first tray element is aligned to deliver said sheet of paper from said second end of said first tray element to said second device; and
   C. activation means attached to said rotation element for selectively activating said rotation element.

2. The apparatus of claim 1, wherein said first tray element includes a plurality of ridges extending longitudinally along said top surface of said first tray element.

3. The apparatus of claim 1, wherein said activation means comprises a stepper motor.

4. The apparatus of claim 3, further comprising a detection element to provide positional feedback to said stepper motor.

5. The apparatus of claim 1, wherein said first tray element further comprises a plurality of wall elements positioned on each side of said first tray element and extending upward from said top surface, at least one of said wall elements being angled outwardly from said first tray element at an angle sufficient to guide said sheet of paper into said first tray element as it is delivered from said first device when said tray element is in said first position.

6. The apparatus of claim 1, further comprising a microprocessor in communication with said activation means for selectively controlling movement of said rotation element.

7. The apparatus of claim 1, wherein said first device comprises a scanner.

8. The apparatus of claim 1, wherein said second device comprises a printer.

9. The apparatus of claim 1, wherein said end stop element comprises a telescoping means for selectively lengthening and shortening said first tray element.

10. The apparatus of claim 1, wherein said apparatus includes a plurality of devices, and said tray assembly further comprises a second tray element, adjacent said first tray element, for receiving a sheet of paper from one of said devices, said second tray element including:
   an end stop element connected to a first end of said second tray element; and
   a second end, opposite said first end, adapted to receive a sheet of paper from one of said devices.

11. The apparatus of claim 10, wherein said second tray element comprises a retaining lip element, proximate said second end of said second tray element, for blocking movement of said sheet of paper out of said second tray element when said tray assembly is in said second position.

12. The apparatus of claim 10, wherein said tray assembly further comprises a third tray element adjacent said first tray element and said second tray element for receiving a sheet of paper from one of said devices, said third tray element including:
   an end stop element connected to a first end of said third tray element; and
   a second end, opposite said first end of said third tray element, adapted to receive a sheet of paper from one of said devices.

13. The apparatus of claim 12, wherein said third tray element comprises a retaining lip, proximate said second end of said third tray element, for blocking movement of said sheet of paper out of said third tray element when said tray assembly is in said second position.

* * * * *